US008565438B2

(12) United States Patent
Jung et al.

(10) Patent No.: US 8,565,438 B2
(45) Date of Patent: Oct. 22, 2013

(54) METHOD OF STORING BROADCAST CONTENTS IN MOBILE BROADCAST SERVICE TERMINAL

(75) Inventors: Ji-Wuck Jung, Suwon-si (KR); Byung-Rae Lee, Seoul (KR); Young-Jip Kim, Suwon-si (KR); Hyun-Chul Kim, Suwon-si (KR); Kyung-Shin Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 417 days.

(21) Appl. No.: 12/234,309

(22) Filed: Sep. 19, 2008

(65) Prior Publication Data
US 2009/0080664 A1    Mar. 26, 2009

(30) Foreign Application Priority Data
Sep. 21, 2007 (KR) .................. 10-2007-0096983

(51) Int. Cl.
  *H04L 9/08* (2006.01)
(52) U.S. Cl.
  USPC ........................................... 380/284
(58) Field of Classification Search
  USPC ........................................... 380/284
  See application file for complete search history.

(56) References Cited

U.S. PATENT DOCUMENTS

| 5,495,533 | A * | 2/1996 | Linehan et al. ............... 713/155 |
| 2005/0209972 | A1 | 9/2005 | Bjorkengren et al. |
| 2007/0189535 | A1 * | 8/2007 | Lee et al. ...................... 380/255 |
| 2008/0056498 | A1 * | 3/2008 | Verma ........................... 380/278 |

FOREIGN PATENT DOCUMENTS

| EP | 1 826 931 | 8/2007 |
| KR | 1020070050325 | 5/2007 |
| KR | 1020070089027 | 8/2007 |
| KR | 1020070089582 | 8/2007 |

OTHER PUBLICATIONS

Open Mobile Alliance: "DRM Content Format", Draft Version 2.1, OMA-TS-DRM-DCF-V2_1-20060915-D, Sep. 15, 2006.
Open Mobile Alliance: "OMA DRM v2.0 Extensions for Broadcast Support", Candidate Version 1.0, OMA-TS-DRM_XBS-V1_0-20070529-C, May 29, 2007.
Open Mobile Alliance: "Service and Content Protection for Mobile Broadcast Services", Candidate Version 1.0, OMA-TS-BCAST_SvcCntProtection-V1_0-20070529-C, May 29, 2007.

* cited by examiner

*Primary Examiner* — Kambiz Zand
*Assistant Examiner* — Stephen Sanders
(74) *Attorney, Agent, or Firm* — The Farrell Law Firm, P.C.

(57) ABSTRACT

Disclosed is a method of recording and storing a broadcast content received for mobile broadcast services in a transmitting-end level. A broadcast receiving terminal includes a type of the key profile in the header of the recorded file for the particular broadcast content, the CIEK which is used in encrypting the broadcast content and encrypted with the second layer encryption key, and the acquisition information on the second layer encryption key. The acquisition information on the second layer encryption key is included in a corresponding field of the header according to the type of the used profile. As in the SRTP and IPSec, a recorded file format in the transmitting-end level recording is the PDCF. Information associated with the encryption of the encrypted broadcast content is stored in the OMA DRM common header box (ohdr box) of the PDCF recorded file.

20 Claims, 3 Drawing Sheets

METHOD OF STORING BROADCAST CONTENTS IN MOBILE BROADCAST SERVICE TERMINAL

PRIORITY

This application claims priority under 35 U.S.C. §119(a) to an application filed in the Korean Industrial Property Office on Sep. 21, 2007 and assigned Serial No. 2007-96983, the contents of which are hereby incorporated by reference.

BACKGROUND OF THE INVENTION

1. Field of the Invention

The present invention relates to a method of storing broadcast contents in a mobile terminal supporting broadcast services, and more particularly to a method of recording and storing broadcast contents received through mobile broadcast services in a transmitting-end level.

2. Description of the Related Art

The mobile communication market constantly faces a demand for new service created through recombination or integration of the existing technologies. Today, due to the development of communication and broadcast technologies, conventional broadcast systems or mobile communication systems has reached the phase of providing mobile broadcast services to a mobile terminal, such as a mobile phone and a Personal Digital Assistant (PDA). Fusion of mobile communication services and the Internet Protocol (IP) technologies is now one of the mainstreams of next generation mobile communication technology development in harmony with potential and substantial market demand, users' increasing need for multimedia services, strategies of service providers desiring to provide new services in addition to the existing voice services, and the interest of Internet Technology (IT) companies reinforcing mobile communication business to meet the users' needs. In addition, commercialization and standardization for mobile broadcast services provided to mobile terminals are actively conducted.

As an example of the standardization, Open Mobile Alliance (OMA) is responsible for discussing and establishing standards of international mobile communication technologies defining the mobile broadcast technology standard. The mobile broadcast technology standard, which is referred to as Open Mobile Alliance Mobile Broadcast (OMA-BCAST), defines various methods of providing mobile broadcast services over a mobile broadcast network. Further, the OMA-BCAST also defines a Service and Content Protection (SCP) standard in order to protect broadcast contents for the mobile broadcast services. In the OMA-BCAST SCP, an encryption technology using a layering concept is defined, in which the broadcast contents are encrypted with a specific key allowing only authorized users to record, store, and transmit the broadcast contents.

FIG. 1 illustrates the layers defined in the OMA-BCAST SCP. Referring to FIG. 1, a first layer (Layer 1) 110 is responsible for registering services in a mobile broadcast receiving terminal (hereinafter referred to as receiving terminal) supporting mobile broadcast services. When the receiving terminal registers a service, the first layer 110 provides a Right Encryption Key (REK) or a Subscribe Manager Key (SMK) as a first layer encryption key. A second layer (Layer 2) 120 transmits an encryption key, which is retained during a period time of service subscription or program transmission. A second layer encryption key is classified into a Service Encryption Key (SEK) and a Program Encryption Key (PEK) according to the type of the encryption key. The SEK or PEK is used to encrypt/decrypt a Traffic Encryption Key (TEK), which is an encryption key of a third layer (Layer 3) 130. The third layer 130 uses the TEK as the third layer encryption key in order to encrypt/decrypt a broadcast content transmitted to the mobile broadcast service. The TEK, together with the broadcast content, is transmitted over a typical broadcast network, and is frequently changed because of the risk of hacking. In a fourth layer 140, the actual broadcast content is transmitted, and the third layer encryption key TEK is used as an decryption key for decrypting the encrypted program and content.

In the layered structure described above, since the TEK transmitted is encrypted with the second layer encryption key SEK or PEK, only receiving terminals having the SEK or PEK capable of decrypting the TEK of the third layer can obtain the right TEK, by which the broadcast content transmitted from the fourth layer (Layer 4) 140 can be decrypted.

In the fourth layer 140, various protocols may be used for broadcast content protection. In the OMA-BCAST SCP, protocols for protecting the broadcast content in the fourth layer 140 include a Secure Real Time Protocol (SRTP), an IP Security Protocol (IPSec), an Internet Streaming Media Alliance Crypto Protocol (ISMACryp), and a DRM Content Format (DCF) protocol. The SRTP and IPSec are used to protect contents by performing encryption at the broadcast transmitting-end, and the ISMACryp and DCF are used to encrypt the contents themselves.

The OMA-BCAST SCP may be classified into two profiles according to the encryption key management schemes: a DRM profile employing the standardized Digital Right Management (OMA-DRM) scheme and a smartcard profile employing a standardized encryption key management scheme included in a smartcard of a terminal. Therefore, only the receiving terminals having a DRM engine or a smartcard corresponding to a protocol being used can record and store broadcast contents received through the mobile broadcast service.

In the OMA-BCAST SCP, since broadcast contents received through a broadcast network or a communication network are recorded and stored in the receiving terminal after being encrypted, only particular users can use the recorded broadcast contents which are encrypted. Further, by defining a format for encrypting and storing broadcast contents, recorded files for encrypted broadcast contents can be shared by multiple terminals.

FIG. 2 illustrates terminals storing and sharing a broadcast content of the OMA-BCAST SCP. Referring to FIG. 2, terminal A 201 and terminal B 203 are authorized to use a particular broadcast content, and terminal C 205 is not authorized to use the particular broadcast content. In general, terminals may be authorized to use particular broadcast contents by being provided with the encryption keys from the mobile broadcast systems providing mobile broadcast services.

Terminal A 201 records and stores the particular broadcast content over a broadcast network or a communication network after encrypting it. Thereafter, terminal A 201 transmits a recorded file 207 for the particular broadcast content to terminal B 203 and terminal C 205. At this time, the recorded file 207 may be transmitted to terminal B 203 and terminal C 205 through a memory card or a network.

Since terminal B 203 has been authorized to use the particular broadcast content, it can obtain the encryption key, which has been used for encrypting in terminal A 201 from the mobile broadcast system. Therefore, the recorded file, which has been encrypted by using the encryption key, can be decrypted and reproduced in terminal B 203.

However, since terminal C 205 is not authorized to use the particular broadcast content, it cannot obtain the encryption key for reproducing the recorded file for the encrypted broadcast content received from terminal A 201. Therefore, the recorded file received from terminal A 201 cannot be reproduced in terminal C 205. If a user of terminal C 205 desires to reproduce the recorded file received from terminal A 201, the user has to obtain a right (right object) to reproduce the recorded file on the user's mobile broadcast system. For obtaining the authorization to use or the right object, acquisition information on the encryption key is included in the recorded file.

In the OMA-BCAST SCP, formats regarding broadcast content recording are defined in two types: a Packetized DRM Content Format (PDCF) and an Adapted-PDCF. In the PDCF, encrypted broadcast contents transmitted at the broadcast transmitting-end are re-encrypted, recorded and stored. The PDCF is used to store broadcast media contents, which are transmitted by being encrypted with the SRTP and IPSec. The Adapted-PDCF is used to store broadcast contents in a case where they are transmitted by being encrypted with the ISMACryp. The PDCF and Adapted-PDCF are defined pursuant to "DRMContent Format" (DCF standard) and "DRM v2.0 Extensions for Broadcast Support" (XBS standard) established by OMA, respectively.

There are two schemes by which the encrypted broadcast contents are generated and stored. Specifically, in order to record broadcast contents, which are transmitted by being encrypted at the transmitting-end using the IPSec and SRTP, broadcast contents are recorded and stored in the PDCF, which is referred to as a transmitting-end level recording scheme. Further, in order to record and store broadcast contents which are transmitted by being encrypted using the ISMACryp, broadcast contents are recorded and stored in the Adapted-PDCF, which is referred to as a content level recording scheme.

However, only receiving terminals supporting the DRM profile of the OMA-BCAST can record broadcast contents in the PDCF. Therefore, in a case where broadcast contents are transmitted by using the transmitting-end encryption protocol, such as IPSec and SRTP, receiving terminals only supporting smartcard profile cannot store broadcast contents in the PDCF.

When broadcast contents are recorded in the PDCF, a receiving terminal supporting the DRM profile generates a Content Item Encryption Key (CIEK) by using a provided DRM engine and encrypts broadcast contents. Thereafter, the receiving terminal encrypts the CIEK with the SEK or PEK. At this time, acquisition information on the SEK or PEK is included in a header of the PDCF file. That is, identification information on the used SEK or PEK and address information on a server providing the SEK or PEK is included in the header of the PDCF file.

Then, the receiving terminal transmits the PDCF file, in which broadcast contents are recorded and stored, to other receiving terminals. The other receiving terminals received the PDCF file obtain the SEK or PEK by using the identification information on the SEK or PEK and the address information on a mobile broadcast system providing the SEK or PEK which are included in the header of the received PDCF file, or purchase the SEK or PEK through the DRM engine. Thereafter, the other receiving terminals can reproduce broadcast contents by decrypting the PDCF file.

However, since receiving terminals supporting a smartcard profile cannot generate acquisition information on the SEK or PEK, which has been used in recording and storing broadcast contents in the PDCF and cannot include the SEK or PEK in the PDCF file, receiving terminals supporting a smartcard profile cannot share the PDCF file with other terminals, nor generate it. Therefore, there is a need for enabling the receiving terminals supporting a smartcard profile to record and store broadcast contents in the transmitting-end level.

SUMMARY OF THE INVENTION

Accordingly, the present invention has been made to solve the above-mentioned problems occurring in the prior art, and the present invention provides a method of recording and storing broadcast contents to be transmitted in accordance with a transmitting-end encryption protocol, such as an IP Security Protocol (IPSec) and a Secure Real Time Protocol (SRTP), for a DRM profile as well as a smartcard profile.

In accordance with an aspect of the present invention, there is provided a method for recording and storing broadcast contents in a mobile broadcast receiving terminal in a transmitting-end level, including encrypting a broadcast content which is received from a mobile broadcast system by generating a first encryption key; generating a recorded file which includes the encrypted broadcast content; storing a key profile type corresponding to the recorded file in a header of the recorded file; wherein, when the first encryption key is encrypted once, encrypting the first encryption key with a second encryption key, storing the encrypted first encryption key in the header of the recorded file, storing acquisition information on the second encryption key in the header of the recorded file, and storing the recorded file.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENT

Figure 1:
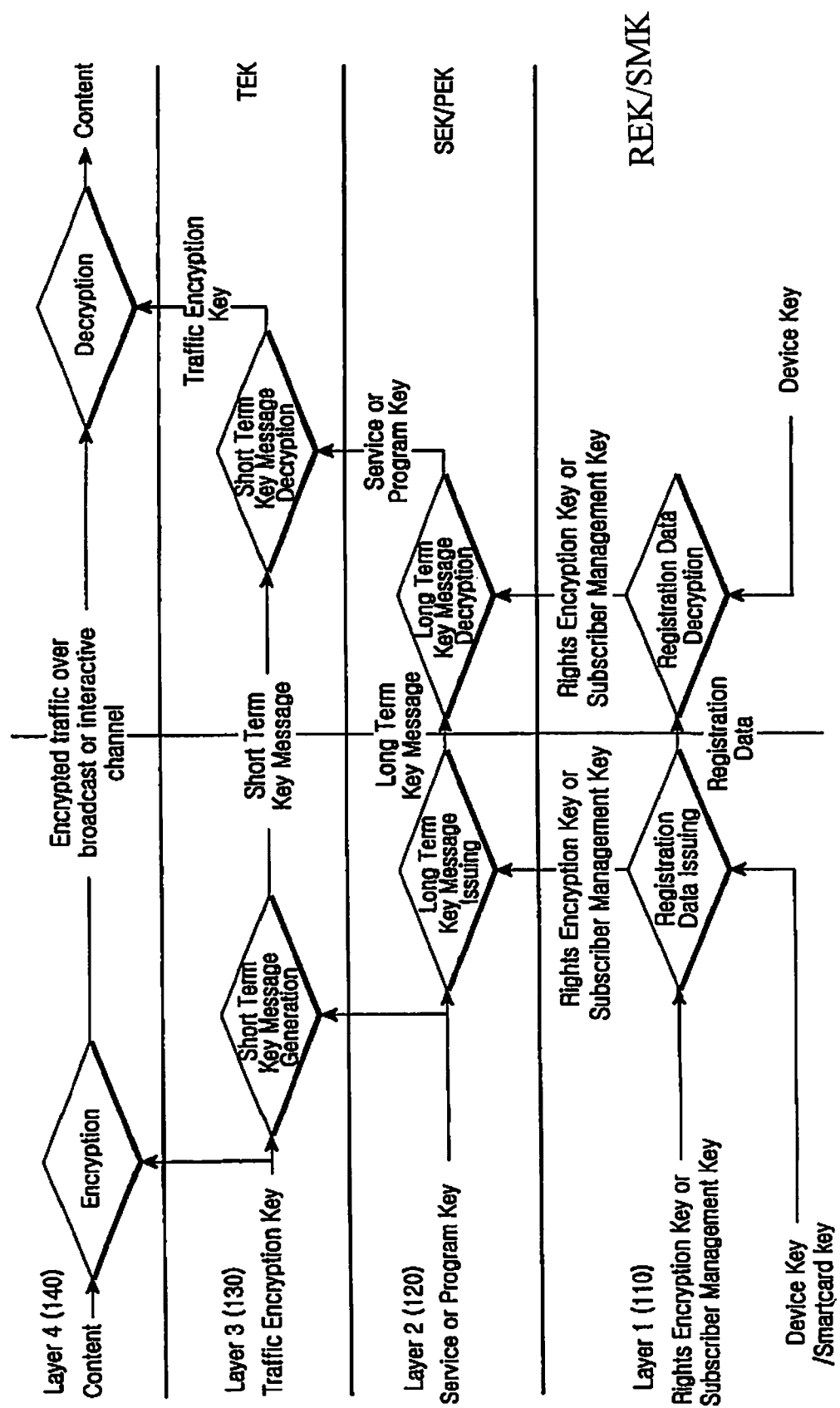
FIG. 1 is a diagram illustrating an OMA-BCAST SCP layer.
Figure 2:
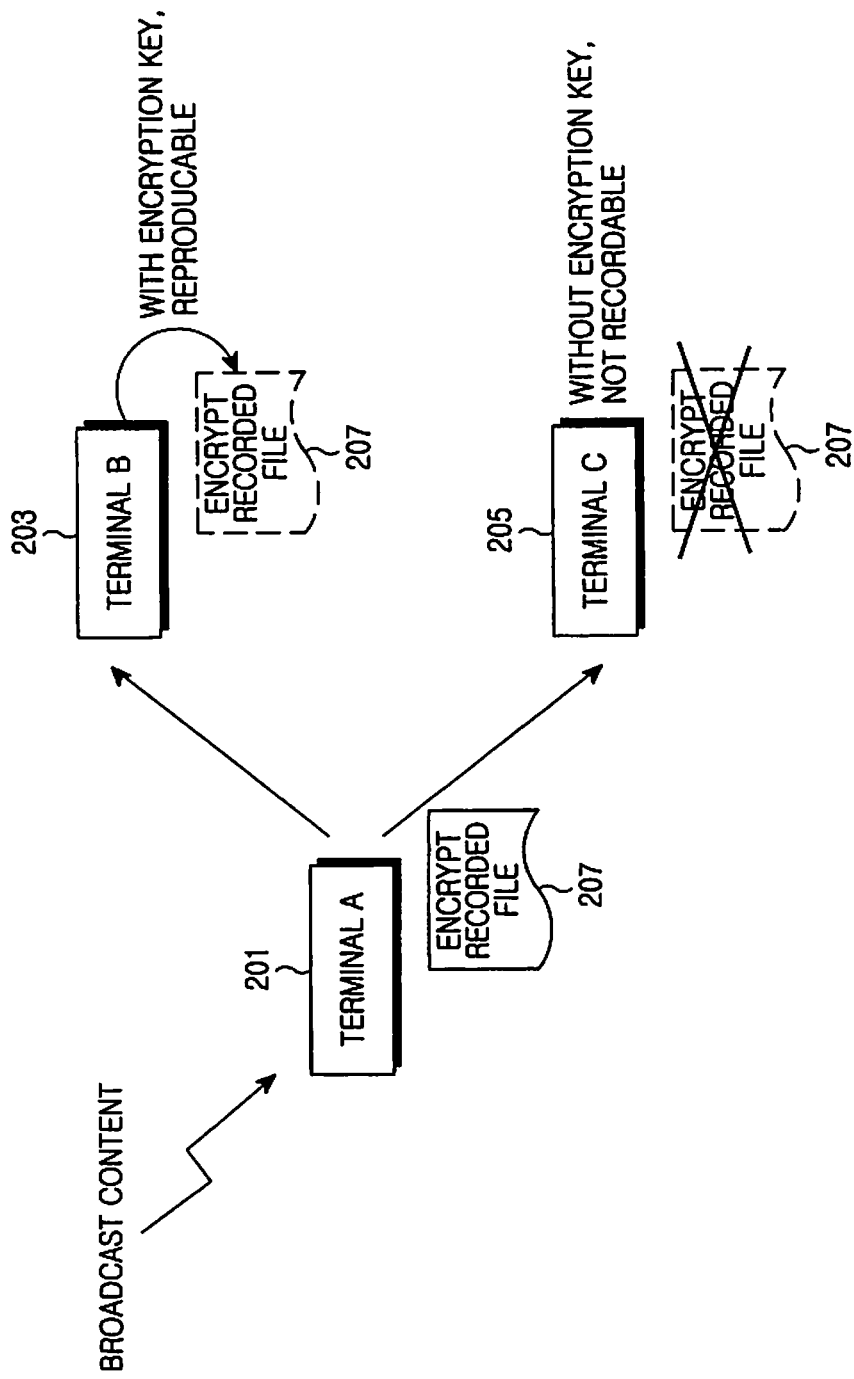
FIG. 2 is a diagram illustrating a sharing relationship of a recorded file.

Hereinafter, preferred embodiments of the present invention will be described with reference to the accompanying drawings. In the following description, the same elements will be designated by the same reference numerals although they are shown in different drawings. Further, various specific definitions found in the following description, such as specific values of packet identifications, contents of displayed information, etc., are provided only to help general understanding of the present invention, and it is apparent to those skilled in the art that the present invention can be implemented without such definitions. Further, in the following description of the present invention, a detailed description of known functions and configurations incorporated herein will be omitted when it may make the subject matter of the present invention rather unclear.

The present invention proposes a method of recording and storing broadcast contents received through mobile broadcast services in a mobile broadcast receiving terminal in a transmitting-end level, the method including the steps of: encrypting a particular broadcast content which is received from a mobile broadcast system by generating a first encryption key, generating a recorded file which includes the encrypted broadcast content; storing a key profile type corresponding to the recorded file in a header of the recorded file; and if the first encryption key is encrypted once, encrypting the first encryption key with a second encryption key, storing the encrypted first encryption key in the header of the recorded file, storing acquisition information on the second encryption key in the header of the recorded file, and storing the recorded file.

In addition, the method includes a step of, if the first encryption key is encrypted twice, encrypting the first encryption key with a third encryption key, encrypting the encrypted first encryption key with the second encryption key, storing the encrypted first encryption key in the header of the recorded file, storing the acquisition information on the second encryption key and acquisition information on the third encryption key in the header of the recorded file, and storing the recorded file.

In addition, the acquisition information on the second encryption key includes identification information for identifying the second encryption key and address information of a server providing the second encryption key, and the acquisition information on the third encryption key includes identification information for identifying the third encryption key and address information of a server providing the third encryption key.

In addition, a format of the recorded file is a Packetized DRM Content Format (PDCF), the first encryption key is a Content Item Encryption Key (CIEK), the second encryption key is a second layer encryption key, the third encryption key is a Traffic Binding Key (TBK), and the key profile further includes a DRM profile and a smartcard profile.

In addition, the method further includes a step of, if the type of the key profile is the smartcard profile, including an Open Mobile Alliance Mobile Broadcast (OMA-BCAST) profile information box indicating that the key profile type is that of the smartcard profile in an OMA DRM common header box.

In addition, the OMA-BCAST profile information box is included in an extended headers box of the OMA DRM common header box, and includes a key profile field to store a field value corresponding to the type of the key profile.

In addition, if the CIEK is encrypted with the TBK before being encrypted with the second layer encryption key, acquisition information on the TBK is included in the extended headers box.

In addition, the identification information of the second layer encryption key is stored in a Group ID field of a group ID box included in the extended headers box, and the address information of the server providing the second layer encryption key is stored in a RightIssuerURL field of the common header box of the OMA DRM.

In addition, the acquisition information on the TBK is stored in an OMA BCAST TBK information box of the extended headers box.

In order to store a particular broadcast content provided from the mobile broadcast system in accordance with a transmitting-end level recording scheme regardless of the type of an encryption key management profile used in the mobile broadcast receiving terminal, according to a preferred embodiment of the present invention, the broadcast receiving terminal includes the type of the used key profile, that is, one of the DRM profile and the smartcard profile, the CIEK which is used in encrypting the broadcast content and encrypted with the second layer encryption key, and the acquisition information on the second layer encryption key in the header of the recorded file for the particular broadcast content.

Here, the acquisition information on the second layer encryption key is included in a corresponding field of the header according to the type of the profile used. The acquisition information includes the address information of the server from which the mobile broadcast receiving terminal can obtain the encryption key and the identification information of the encryption key.

When broadcast contents to be transmitted is encrypted and recorded at a transmitting-end by using a transmitting-end encryption protocol, such as SRTP and IPSec, a recorded file format in the transmitting-end level recording is the PDCF. Therefore, the recorded file according to the present invention is a PDCF recorded file. Information associated with encryption of the encrypted broadcast content is stored in the OMA DRM common header box (hereinafter referred as ohdr box) of the PDCF recorded file.

A structure of the ohdr box is shown below in Table 1.

TABLE 1

```
aligned(8) class OMADRMCommonHeaders extends FullBox('ohdr', version, 0)
    unsigned int(8)      EncryptionMethod;       // Encryption method
    unsigned int(8)      PaddingScheme;          // Padding type
    unsigned int(64)     PlaintextLength;        // Plaintext content length in bytes
    unsigned int(16)     ContentIDLength;        // Length of ContentID field in bytes
    unsigned int(16)     RightsIssuerURLLength;  // Rights Issuer URL field length in bytes
    unsigned int(16)     TextualHeadersLength;   // Length of the TextualHeaders array in bytes
    char                 ContentID[ ];           // Content ID string
    char                 RightsIssuerURL[ ];     // Rights Issuer URL string
    string               TextualHeaders[ ];      // Additional headers as Name:Value pairs
    Box                  ExtendedHeaders[ ];     // Extended headers boxes
```

Referring to Table 1, in the EncryptionMethod field, the type of a used encryption algorithm is stored to encrypt the broadcast content. For example, in a case where a value of the EncryptionMethod field is 0x00, it denotes that the broadcast content has not been encrypted. In a case where the value is 0x01, it denotes that the broadcast content has been encrypted with the AES-128-CBC algorithm. In a case where the value is 0x02, it denotes that the broadcast content has been encrypted with the AES-128-CTR algorithm.

In the Content ID field, an ID of the broadcast content, which is encrypted and recorded is recorded. The content ID is used to obtain the second layer encryption key for decrypting the CIEK, which has been used when the broadcast content was recorded. In other words, the CIEK is encrypted with the SEK or PEK, which is the second layer encryption key, and is stored in the ExtendedHeaders box of the ohdr box of the PDCF recorded file. The content ID is used to obtain the SEK or PEK for decrypting the encrypted CIEK.

The URL address information of a right issuer server from which rights for the SEK or PEK needed to acquire the CIEK can be purchased is stored in the RightIssuerURL field. Therefore, if the receiving terminal reproducing the PDCF recorded file does not have the encryption keys, the receiving terminal may obtain the SEK or PEK for decrypting the CIEK by obtaining or purchasing the right object through the right issuer server by using the address information stored in the RightIssuerURL field. Further, in the RightIssuerURL, a recording information block is encoded with a Base64 encoding, and is included as additional information needed for reproducing the encrypted broadcast content.

The Recording Information Block is shown in Table 2 below.

TABLE 2

| Field | Length | Type |
|---|---|---|
| OMADRMRecordingInformationBlockBase( ){ | | |
|    BCI | 96 | bslbf |
|    OMADRMRecordingTimestamp( )timestamp( ) | 72 | OMADRMRecordingTimestamp( ) |
|    Salt | 128 | bslbf |
|    Salted_key | 128 | bslbf |
| } | | |
| OMADRMRecordingInformationBlock( ){ | | |
|    OMADRMRecordingInformationBlockBase( ) | 424 | |
|    MAC | 96 | bslbf |
| } | | |
| OMADRMRecordingInformationBlockSigned( ){ | | |
|    OMADRMRecordingInformationBlockBase( ) | 424 | |
|    signature_type_flag | 2 | uimsbf |
|    reserved_for_future_use | 6 | bslbf |
|    /*signature is computed over all preceding fields.*/ | | |
|    If(signature_type_flag==0☐0){ | | |
|      signature | 1024 | bslbf |
|    }else if (signature_type_flag==0☐01){ | | |
|      signature | 2048 | bslbf |
|    }else if(signature_type_flag==0☐02){ | | |
|      signature | 4096 | bslbf |
|    } | | |
| } | | |

Further, the extended headers box of the ohdr box includes a Group ID box (hereinafter referred as grpi box). The grpi box is shown in Table 3 below.

TABLE 3 aligned (8) class OMADRMGroupID extends FullBox('grpi', version, 0)
   { unsigned int(16) GroupIDLength;   // length of the Group ID URI
   unsigned int(8) GKEncryptionMethod; // Group Key encryption algorithm
   unsigned int(16) GKLength;   // length of the encrypted Group Key
   char GroupID[GroupIDLength];   // Group ID URI
   byte GroupKey[GKLength];   // Encrypted Group Key and encryption information
}

Referring to Table 3, the GKEncryptionMethod field is defined by an algorithm, which encrypts a Group Key, and the defined value is stored in the EncryptionMethod field. In the Group ID field, an ID of the Group Key is stored. Further, in the GroupKey field, the CIEK used to encrypt and store the broadcast content to be stored in the PDCF recorded file is stored by being encrypted with the SEK or PEK, which is the second layer encryption key.

Further, according to the preferred embodiment of the present invention, the extended headers box of the ohdr box may include an OMA BCAST Profile Information Box (obpi box). If the key profile used in recording the broadcast content is the smartcard profile, the obpi box must be included in the extended headers box. In contrast, if the key profile used in recording the broadcast content is the DRM profile, the obpi box may not be included in the extended headers box. In addition, some information in the ohdr box is changed depending on whether the key profile of the receiving terminal is the smartcard profile or the DRM profile. An example of the obpi box is shown in Table 4 below.

TABLE 4 aligned(8) class OMABCASTProfileInfoBox extends FullBox('obpi', version, flags)
   { unsigned int(8) KeyProfile; }

Referring to Table 4, the obpi box includes the KeyProfile field, and is included as one of the extended headers box of the ohdr box.

Table 5 shows values which may be included in the KeyProfile field.

TABLE 5

| type of Key Profile | Value |
|---|---|
| OMA BCAST DRM profile | 0x00 |
| OMA BCAST Smartcard profile | 0x01 |

That is, in a case where a value of the KeyProfile field is 0x00, it denotes that the recorded file has been generated in the PDCF by using the OMA BCAST DRM profile. In a case where the value is 0x01, it denotes that the recorded file has been generated in the PDCF by using the OMA BCAST smartcard profile.

Further, the obpi box is an optional box. If the obpi box is not included in the extended headers box of the ohdr box, it is assumed that the type of the key profile is the OMA BCAST DRM profile. This assumption makes the key profile compatible with the PDCF supporting the DRM profile defined by the existing XBS standard.

Some values included in the ohdr box in Table 1 and in the grpi box in Table 3 can be changed depending on the key profile information of the obpi box. In a case where the key profile is the DRM profile, the fields are defined to have the same form as in the XBS standard. In a case where the key profile is the smartcard profile, the fields can be defined to have the same form as set forth in the present invention. The values depending on the type of the key profile are as follows.

Firstly, a field which is changed in the ohdr box is the RightIssuerURL field. Since the RightIssuerURL field is a field in which the address information of the server providing the second layer encryption key is stored, when the key profile is set to the smartcard profile, the address information of the server providing the encryption key of the smartcard profile is stored in the RightIssuerURL field. Therefore, the receiving terminal using the smartcard profile can obtain information of the second layer encryption key for reproducing the PDCF recorded file by using the address information in KeyIssuerURL field. A storage format of the value of the RightIssuerURL field according to the type of the key profile is shown in Table 6 below.

TABLE 6

| Field | DRM profile | smartcard profile |
| --- | --- | --- |
| RightIssuerURL | Rights Issuer URL + "?rib=" + base64(recording information block) | Key Issuer URL + "?rib=" + base64(recording block information) |

In addition, another field whose value is changed in the grpi box is the GroupID field, as shown in Table 7 below.

TABLE 7

| Field | DRM profile | smartcard profile |
| --- | --- | --- |
| GroupID | service: "cid:service_BCI@"||base64Binary(service_BCI) program: "cid:program_BCI@"||base64Binary(program_BCI) | service: "sekid@"||base64Binary(sek_id) program: "pekid@"||base64Binary(pek_id) |

Referring to Table 7, a Broadcast Content Identifier (BCI) of the DRM profile corresponds to the SEK or PEK of the smartcard profile. Therefore, the BCI field of the recording information block configured as in Table 2 is changed to a SEK/PEK ID field. The SEK/PEK ID field consists of seven bytes of data consisting a Key Domain ID of 3 bytes and a SEK/PEK ID of 4 bytes. The SEK or PEK can be uniquely determined by using the seven bytes of the SEK/PEK ID field. In the smartcard profile, when the associated information is a service, the SEK/PEK ID is determined as that of the SEK; and when it is a program, the SEK/PEK ID is determined as that of the PEK.

Meanwhile, in the smartcard profile, the TBK may be used to encrypt the TEK. Therefore, in a case where the TBK is used in recording the broadcast content, information for obtaining the TBK must be included. Therefore, according to the preferred embodiment of the present invention, an OMA BCAST TBK Information Box (hereinafter referred to as obti box) is optionally added to the extended headers box in the odhr box as in the case of the obpi box, and is effective only when the key profile of the obpi box is the smartcard profile. Further, in a case where the obti box is not included, it is assumed that the TBK has not been used even though the key profile is the smartcard profile. The obti box is shown as in Table 8 below.

TABLE 8 aligned (8) class OMABCASTTBKInformation extends FullBox('obti', version, 0)
{ unsigned int(32) TBK_ID;         // TerminalBindingKeyID
  unsigned int(16) TBKIssuerURLLength;  // TBK Issuer URL field length in bytes
  char TBKIssuerURL[ ];           // TBKIssuer URL string
}

In addition, the CIEK for encrypting the data of the PDCF recorded file is stored by being encrypted in the form of the Group Key of the grpi box. Since the TBK, as well as the SEK/PEK, may also be used to encrypt the CIEK in a case of the smartcard profile, when the TBK is used, acquisition information of the TBK is stored in the Group Key field in the grpi box in Table 3. Accordingly, values of the Group Key field according to the key profile are shown in Table 9 below.

TABLE 9

| Field | DRM profile | Smartcard profile |
| --- | --- | --- |
| Group Key | CIEK := random 128-bit AES key or KEKsek/pek<br>IV := random 128 bit number<br>GroupKey := IV\|\|AES − BCKEYsek/pek(CIEK) | CIEK := random 128-bit AES key or KEKsek/pek<br>IV := random 128 bit number<br>TBK Encrypted CIEK := AES−ECB$_{TBK}$(CIEK)<br>GroupKey := IV\|\|AES − CBCKEYsek/pek(TBK Encrypted CIEK) |

Therefore, the header of the PDCF recorded file as defined herein above enables the mobile broadcast receiving terminal to record and store the PDCF recorded file in a transmitting-end level for not only the DRM profile but also the smartcard profile. In other words, the receiving terminal using the smartcard profile can also reproduce, store, and share the PDCF recorded file.

When the receiving terminal using the smartcard profile receives the PDCF recorded file from another receiving terminal, or when the receiving terminal does not have the encryption key which is used when the current PDCF recorded file is generated, processes for obtaining the encryption key for reproducing the PDCF recorded file will now be described as follows in connection with FIG. 3.

Figure 3:
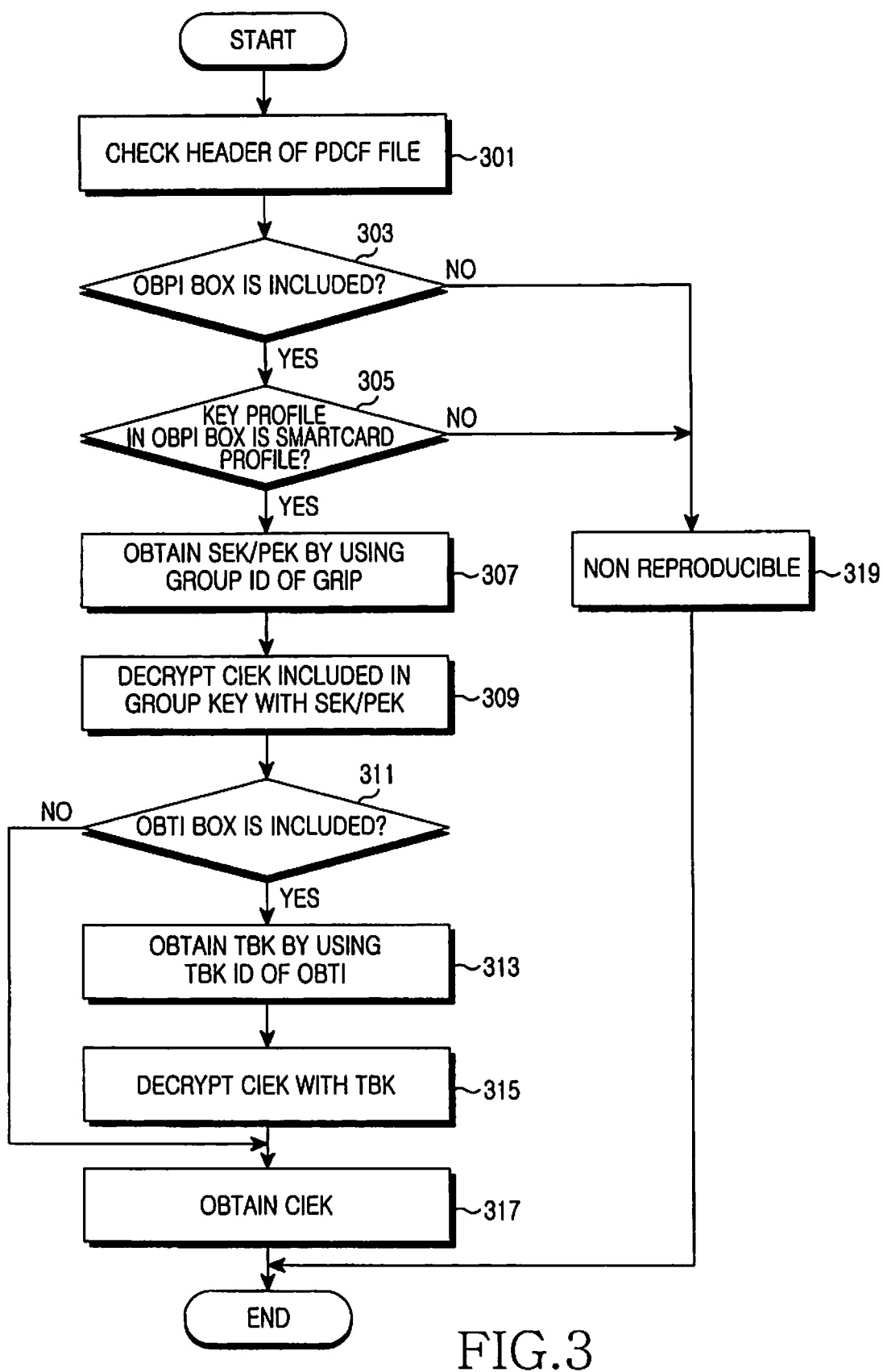
FIG. 3 is a flowchart illustrating an operation process of a receiving terminal according to an embodiment of the present invention.

Referring to FIG. 3, in order to reproduce the PDCF recorded file, the receiving terminal using the smartcard profile determines whether the obpi box is included in the extended headers box of the ohdr box by checking the header of the PDCF recorded file in steps 301 and 303. If the obpi box is not included in the ohdr box, or the key profile field in the obpi box represents the DRM profile, the receiving terminal cannot reproduce the recorded file because the current receiving terminal supports only the smartcard profile. If the receiving terminal supports the DRM profile, the PDCF recorded file can be reproduced in accordance with the existing XBS standard as shown in step 303, 305, and 319.

If the key profile of the obpi box is the smartcard profile, the receiving terminal connects to a server corresponding to the address information included in the RightIssuerURL field by using the SEK/PEK ID of the Group ID field in the grpi box, so the SEK/PEK is obtained (step 307). Then, the CIEK which has encrypted with the SEK/PEK is obtained by decrypting lower 16 bytes in the Group Key field in step 309. The process for obtaining the SEK/PEK from the server has been defined in the OMA BCAST SCP standard (OMA-TS-BCAST_SvcCntProtection-V1.0).

Thereafter, the receiving terminal determines whether the obti box is included in the extended headers box of the ohdr box in step 311. If the obti box is included in the extended headers box, since the TBK has been used for encrypting the CIEK, the TBK which coincides with the TBK_ID in obti box (step 313) is obtained. The process for obtaining the TBK has been defined in the OMA BCAST SCP standard. Using the TBK, the CIEK is decrypted with the SEK/PEK in the AEC-ECB mode, so that the final CIEK can be obtained in step 317, as shown in step 313 and 315.

The final CIEK can be obtained by subjecting the CIEK decrypted with the SEK/PEK to AES-ECB decryption by using the TBK.

If the TBK is not used, that is, if the obti box is not included in the extended headers in the ohdr box, since the CIEK decrypted with the SEK/PEK is a key which has been used in encrypting the broadcast content, the final CIEK can be used without subjecting it to additional processes. As a result, the receiving terminal can reproduce the PDCF recorded file by using the final CIEK, as in reproducing the current PDCF media.

According to the present invention, a broadcast content to be transmitted in accordance with a transmitting-end encryption protocol, such as an IP Security Protocol (IPSec) and a Secure Real Time Protocol (SRTP), can be recorded and stored for the DRM profile as well as for the smartcard profile. Therefore, the receiving terminal using the smartcard profile can record and store the broadcast content in a transmitting-end level and share files recorded in a transmitting-end level with other terminals.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for recording and storing broadcast contents in a mobile broadcast receiving terminal at a transmitting-end level of mobile broadcast services, comprising:
generating a first encryption key;
encrypting a broadcast content received from a mobile broadcast system using the first encryption key;
generating a recorded file including the encrypted broadcast content;
storing a key profile type corresponding to the recorded file in a header of the recorded file; and
encrypting the first encryption key at least once,
wherein, when the first encryption key is encrypted once, encrypting the first encryption key with a second encryption key, storing the encrypted first encryption key in the header of the recorded file, storing acquisition information on the second encryption key in the header of the recorded file, and storing the recorded file.

2. The method as claimed in claim 1, wherein, when the first encryption key is encrypted twice, encrypting the first encryption key with a third encryption key, encrypting the encrypted first encryption key with the second encryption key, storing the twice encrypted first encryption key in the header of the recorded file, storing the acquisition information on the second encryption key and acquisition information on the third encryption key in the header of the recorded file, and storing the recorded file.

3. The method as claimed in claim 2, wherein the acquisition information on the second encryption key includes a first identification information for identifying the second encryption key and address information of a server providing the second encryption key, and the acquisition information on the third encryption key includes a second identification information for identifying the third encryption key and address information of a server providing the third encryption key.

4. The method as claimed in claim 3, wherein a format of the recorded file is a Packetized DRM Content Format (PDCF), the first encryption key is a Content Item Encryption Key (CIEK), the second encryption key is a second layer encryption key, the third encryption key is a Traffic Binding Key (TBK), and the key profile further includes a (DRM) DIGITAL RIGHTS MANAGEMENT profile and a smartcard profile.

5. The method as claimed in claim 4, wherein, when the key profile type corresponds to the smartcard profile, including an Open Mobile Alliance Mobile Broadcast (OMA-BCAST) profile information box indicating that the key profile type corresponds to the smartcard profile in an OMA DRM common header box,
wherein the acquisition information on the TBK is stored in an OMA BCAST TBK information box of an extended headers box.

6. The method as claimed in claim 5, wherein the OMA-BCAST profile information box is included in the extended headers box of the OMA DRM common header box, and includes a key profile field for storing a field value corresponding to the key profile type.

7. The method as claimed in claim 6, wherein, when the CIEK is encrypted with the TBK before being encrypted with the second layer encryption key, acquisition information for the TBK is included in the extended headers box.

8. The method as claimed in claim 7, wherein the first identification information of the second layer encryption key is stored in a Group ID field of a group ID box included in the extended headers box, and the address information of the server providing the second layer encryption key is stored in a RightIssuerURL field of the common header box of the OMA DRM.

9. The method as claimed in claim 1, further comprising:
determining the key profile type included in the recorded file for reproducing the recorded file;
obtaining the second encryption key by using the acquisition information included in the recorded file;
decrypting the encrypted first encryption key included in the recorded file by using the obtained second encryption key; and
decrypting the recorded file by using the decrypted first encryption key.

10. A mobile broadcast receiving terminal for recording and storing broadcast content at a transmitting-end level of mobile broadcast services, comprising:
processor means for generating a first encryption key, encrypting a broadcast content received from a mobile broadcast system using the first encryption key, generating a recorded file including the encrypted broadcast content, storing a key profile type corresponding to the recorded file in a header of the recorded file, and encrypting the first encryption key at least once; and
storing means for the recorded file, wherein, when the first encryption key is encrypted once, encrypting the first encryption key with a second encryption key, storing the encrypted first encryption key in the header of the recorded file, storing acquisition information on the second encryption key in the header of the recorded file, and storing the recorded file.

11. The mobile broadcast receiving terminal as claimed in claim 10, wherein, when the first encryption key is encrypted twice, encrypting the first encryption key with a third encryption key, encrypting the encrypted first encryption key with the second encryption key, storing the twice encrypted first encryption key in the header of the recorded file, storing the acquisition information on the second encryption key and acquisition information on the third encryption key in the header of the recorded file, and storing the recorded file.

12. The mobile broadcast receiving terminal as claimed in claim 11, wherein the acquisition information on the second encryption key includes a first identification information for identifying the second encryption key and address information of a server providing the second encryption key, and the acquisition information on the third encryption key includes a second identification information for identifying the third encryption key and address information of a server providing the third encryption key.

13. The mobile broadcast receiving terminal as claimed in claim 12, wherein a format of the recorded file is a Packetized DRM Content Format (PDCF), the first encryption key is a Content Item Encryption Key (CIEK), the second encryption key is a second layer encryption key, the third encryption key is a Traffic Binding Key (TBK), and the key profile further includes a (DRM) DIGITAL RIGHTS MANAGEMENT profile and a smartcard profile.

14. The mobile broadcast receiving terminal as claimed in claim 13, wherein, when the key profile type corresponds to the smartcard profile, including an Open Mobile Alliance Mobile Broadcast (OMA-BCAST) profile information box indicating that the key profile type corresponds to the smartcard profile in an OMA DRM common header box.

15. The mobile broadcast receiving terminal as claimed in claim 14, wherein the OMA-BCAST profile information box is included in an extended headers box of the OMA DRM common header box, and includes a key profile field for storing a field value corresponding to the key profile type,
wherein the acquisition information on the TBK is stored in an OMA BCAST TBK information box of the extended headers box.

16. The mobile broadcast receiving terminal as claimed in claim 15, wherein, when the CIEK is encrypted with the TBK before being encrypted with the second layer encryption key, acquisition information for the TBK is included in the extended headers box.

17. The mobile broadcast receiving terminal as claimed in claim 16, wherein the first identification information of the second layer encryption key is stored in a Group ID field of a group ID box included in the extended headers box, and the address information of the server providing the second layer encryption key is stored in a RightIssuerURL field of the common header box of the OMA DRM.

18. The mobile broadcast receiving terminal as claimed in claim 10, wherein the processor means determines the key profile type included in the recorded file for reproducing the recorded file, obtains the second encryption key by using the acquisition information included in the recorded file, decrypts the encrypted first encryption key included in the recorded file by using the obtained second encryption key; and decrypts the recorded file by using the decrypted first encryption key.

19. The method as claimed in claim 3, wherein the first identification information includes content ID of the broadcast content received.

20. The mobile broadcast receiving terminal as claimed in claim 12, wherein the first identification information includes content ID of the broadcast content received.

* * * * *